United States Patent
Bhaduri et al.

(10) Patent No.: US 11,254,850 B2
(45) Date of Patent: Feb. 22, 2022

(54) TREATMENT METHODS USING AQUEOUS FLUIDS CONTAINING OIL-SOLUBLE TREATMENT AGENTS

(71) Applicant: Baker Hughes, LLC, Houston, TX (US)

(72) Inventors: Sumit Bhaduri, The Woodlands, TX (US); Frances H. DeBenedictis, Spring, TX (US); D.V. Satyanarayana Gupta, The Woodlands, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 0 days.

(21) Appl. No.: 16/756,300

(22) PCT Filed: Nov. 3, 2017

(86) PCT No.: PCT/US2017/059919
§ 371 (c)(1),
(2) Date: Apr. 15, 2020

(87) PCT Pub. No.: WO2019/089043
PCT Pub. Date: May 9, 2019

(65) Prior Publication Data
US 2020/0299560 A1    Sep. 24, 2020

(51) Int. Cl.
*C09K 8/536*    (2006.01)
*C09K 8/035*    (2006.01)
(Continued)

(52) U.S. Cl.
CPC ............. *C09K 8/035* (2013.01); *C09K 8/524* (2013.01); *C09K 8/528* (2013.01); *C09K 8/536* (2013.01);
(Continued)

(58) Field of Classification Search
None
See application file for complete search history.

(56) References Cited

U.S. PATENT DOCUMENTS

| 1,570,537 A | 1/1926 | Teitsworth |
| 2,378,155 A | 6/1945 | Newsome |

(Continued)

FOREIGN PATENT DOCUMENTS

| CA | 1262507 A | 10/1989 |
| EP | 0540204 A2 | 5/1993 |

(Continued)

OTHER PUBLICATIONS

P.J.C. Webb AEA Technology PLC, T.A., et al.; Revolutionary New Chemical Delivery System for Fractured, Gravel Packed and Prepacked Screen Wells; SPE 38164; 1997.

(Continued)

*Primary Examiner* — Andrew Sue-Ako
(74) *Attorney, Agent, or Firm* — John Wilson Jones; Jones Delflache LLP

(57) ABSTRACT

A method of treating a well or a subterranean formation with an aqueous treatment fluid containing one or more oil-soluble, water-insoluble well treatment agents. The fluid includes an aqueous dispersion containing the well treatment agent in an amount from 25 to 60 weight percent. The volume average particle diameter of the oil-soluble well treatment agent in the fluid may be less than or equal to 2.5 microns. The fluid may further contain a water-soluble well treatment agent.

20 Claims, 1 Drawing Sheet

(51) Int. Cl.

| | | |
|---|---|---|
| *C09K 8/524* | (2006.01) | |
| *C09K 8/528* | (2006.01) | |
| *C09K 8/60* | (2006.01) | |
| *C09K 8/68* | (2006.01) | |
| *C09K 8/70* | (2006.01) | |
| *C09K 8/88* | (2006.01) | |
| *C09K 8/92* | (2006.01) | |

(52) U.S. Cl.
CPC .............. *C09K 8/605* (2013.01); *C09K 8/68* (2013.01); *C09K 8/70* (2013.01); *C09K 8/882* (2013.01); *C09K 8/885* (2013.01); *C09K 8/92* (2013.01); *C09K 2208/32* (2013.01)

(56) References Cited

U.S. PATENT DOCUMENTS

| | | |
|---|---|---|
| 3,179,170 A | 4/1965 | Burtch et al. |
| 3,283,817 A | 11/1966 | Roberts |
| 3,722,592 A | 3/1973 | Bucaram et al. |
| 3,782,469 A | 1/1974 | Fulford |
| 3,850,248 A | 11/1974 | Carney |
| 3,987,850 A | 10/1976 | Fitch |
| 3,991,827 A | 11/1976 | Schall |
| 4,008,763 A | 2/1977 | Lowe, Jr. |
| 4,013,587 A | 3/1977 | Fischer et al. |
| 4,108,779 A | 8/1978 | Carney |
| 4,109,721 A | 8/1978 | Slusser |
| 4,264,329 A | 4/1981 | Beckett |
| 4,352,741 A | 10/1982 | Wernau |
| 4,390,456 A | 6/1983 | Sanchez et al. |
| 4,552,591 A | 11/1985 | Millar |
| 4,582,131 A | 4/1986 | Plummer et al. |
| 4,660,645 A | 4/1987 | Newlove et al. |
| 4,670,166 A | 6/1987 | McDougall et al. |
| 4,738,897 A | 4/1988 | McDougall et al. |
| 4,905,762 A | 3/1990 | Zilch |
| 4,986,353 A | 1/1991 | Clark et al. |
| 5,073,276 A | 12/1991 | Newlove et al. |
| 5,102,558 A | 4/1992 | McDougall et al. |
| 5,187,011 A | 2/1993 | Manalastas et al. |
| 5,224,543 A | 7/1993 | Watkins et al. |
| 5,225,123 A | 7/1993 | Torobin |
| 5,243,190 A | 9/1993 | Bandy et al. |
| 5,741,758 A | 4/1998 | Pakulski |
| 5,758,725 A | 6/1998 | Streetman |
| 5,892,147 A | 4/1999 | Games et al. |
| 5,893,416 A | 4/1999 | Read |
| 5,922,652 A | 7/1999 | Kowalski et al. |
| 5,964,291 A | 10/1999 | Bourne et al. |
| 6,025,302 A | 2/2000 | Pakulski |
| 6,100,221 A | 8/2000 | Poelker et al. |
| 6,209,643 B1 | 4/2001 | Nguyen et al. |
| 6,209,646 B1 | 4/2001 | Reddy et al. |
| 6,279,656 B1 | 8/2001 | Sinclair et al. |
| 6,326,335 B1 | 12/2001 | Kowalski et al. |
| 6,331,508 B1 | 12/2001 | Pakulski |
| 6,380,136 B1 | 4/2002 | Bates et al. |
| 6,439,310 B1 | 8/2002 | Scott, III et al. |
| 6,527,051 B1 | 3/2003 | Reddy et al. |
| 6,613,899 B1 | 9/2003 | Kuzzee et al. |
| 6,645,769 B2 | 11/2003 | Tayebi et al. |
| 6,723,683 B2 | 4/2004 | Crossman et al. |
| 6,866,797 B1 | 3/2005 | Martin et al. |
| 7,028,776 B2 | 4/2006 | Kirk |
| 7,270,184 B2 | 9/2007 | Kotlar et al. |
| 7,347,260 B2 | 3/2008 | Ferguson et al. |
| 7,380,606 B2 | 6/2008 | Pursley et al. |
| 7,419,937 B2 | 9/2008 | Rimmer et al. |
| 7,426,961 B2 | 9/2008 | Stephenson et al. |
| 7,459,209 B2 | 12/2008 | Smith et al. |
| 7,491,682 B2 | 2/2009 | Gupta et al. |
| 7,493,955 B2 | 2/2009 | Gupta et al. |
| 7,494,711 B2 | 2/2009 | Kaufman et al. |
| 7,500,522 B2 | 3/2009 | Skibinski et al. |
| 7,560,690 B2 | 7/2009 | Stray et al. |
| 7,598,209 B2 | 10/2009 | Kaufman et al. |
| 7,686,081 B1 | 3/2010 | Becker |
| 7,896,078 B2 | 3/2011 | Wang et al. |
| 8,596,354 B2 | 12/2013 | Hartshorne et al. |
| 8,664,168 B2 | 3/2014 | Steiner |
| 8,853,619 B2 | 10/2014 | Preudhomme et al. |
| 9,010,430 B2 | 4/2015 | Darby et al. |
| 9,029,300 B2 | 5/2015 | Gupta |
| 9,102,860 B2 | 8/2015 | Cawiezel et al. |
| 9,874,080 B2 | 1/2018 | Gupta et al. |
| 9,976,070 B2 | 5/2018 | Gupta et al. |
| 10,400,159 B2 | 9/2019 | Gupta |
| 2002/0128157 A1 | 9/2002 | Bates et al. |
| 2003/0006036 A1 | 1/2003 | Malone et al. |
| 2004/0043906 A1 | 3/2004 | Heath et al. |
| 2004/0060702 A1 | 4/2004 | Kotlar et al. |
| 2004/0074646 A1 | 4/2004 | Kotlar et al. |
| 2004/0224155 A1 | 11/2004 | Barron et al. |
| 2004/0244969 A1 | 12/2004 | Kotlar et al. |
| 2005/0022991 A1 | 2/2005 | Rao |
| 2005/0028976 A1 | 2/2005 | Nugyen et al. |
| 2005/0034868 A1 | 2/2005 | Frost et al. |
| 2005/0115710 A1 | 6/2005 | Kotlar et al. |
| 2006/0065396 A1 | 3/2006 | Dawson et al. |
| 2006/0091572 A1 | 5/2006 | Santra et al. |
| 2006/0124301 A1 | 6/2006 | Gupta |
| 2006/0124302 A1 | 6/2006 | Gupta et al. |
| 2006/0194700 A1* | 8/2006 | Gatlin ..................... C09K 8/22 507/140 |
| 2007/0036977 A1 | 2/2007 | Sinclair et al. |
| 2007/0062101 A1 | 3/2007 | Delamotte et al. |
| 2007/0095528 A1 | 5/2007 | Ziauddin et al. |
| 2007/0173417 A1 | 7/2007 | Kaufman et al. |
| 2007/0202318 A1 | 8/2007 | Smith et al. |
| 2008/0035339 A1 | 2/2008 | Welton et al. |
| 2008/0035340 A1 | 2/2008 | Welton et al. |
| 2008/0053657 A1 | 3/2008 | Alary et al. |
| 2008/0058228 A1 | 3/2008 | Wilson |
| 2008/0058229 A1 | 3/2008 | Berkland et al. |
| 2008/0078547 A1 | 4/2008 | Sinclair et al. |
| 2008/0182765 A1 | 7/2008 | Pershikova et al. |
| 2008/0210421 A1 | 9/2008 | Wilson et al. |
| 2008/0217012 A1 | 9/2008 | Delorey et al. |
| 2008/0287324 A1 | 11/2008 | Pursley et al. |
| 2009/0025470 A1 | 1/2009 | Green et al. |
| 2009/0114247 A1 | 5/2009 | Brown et al. |
| 2009/0131285 A1 | 5/2009 | Wang et al. |
| 2009/0291861 A1 | 11/2009 | Sawdon |
| 2009/0325825 A1 | 12/2009 | Gupta et al. |
| 2010/0059224 A1 | 3/2010 | Palamara et al. |
| 2010/0065275 A1 | 3/2010 | McGowen et al. |
| 2010/0130385 A1 | 5/2010 | Guzmann et al. |
| 2010/0175875 A1 | 7/2010 | Becker et al. |
| 2010/0304418 A1 | 12/2010 | Moussavi et al. |
| 2010/0307745 A1 | 12/2010 | Lafitte et al. |
| 2011/0146974 A1 | 6/2011 | Hartshorne et al. |
| 2012/0012326 A1 | 1/2012 | Darby et al. |
| 2012/0292025 A1 | 11/2012 | Stoll |
| 2012/0318515 A1 | 12/2012 | Cawiezel et al. |
| 2013/0029883 A1 | 1/2013 | Dismuke et al. |
| 2013/0123149 A1 | 5/2013 | Berkland et al. |
| 2013/0126158 A1 | 5/2013 | Gupta et al. |
| 2013/0341012 A1 | 12/2013 | Belani et al. |
| 2014/0048273 A1 | 2/2014 | Southwick et al. |
| 2014/0190692 A1 | 7/2014 | Hibbeler et al. |
| 2014/0209304 A1 | 7/2014 | Reed et al. |
| 2014/0305650 A1 | 10/2014 | Song et al. |
| 2015/0075792 A1 | 3/2015 | Brandl et al. |
| 2015/0198010 A1 | 7/2015 | Doan et al. |
| 2015/0330197 A1 | 11/2015 | Brannon et al. |
| 2015/0369822 A1 | 12/2015 | Strandburg et al. |
| 2016/0030916 A1 | 2/2016 | Shen et al. |
| 2016/0046855 A1 | 2/2016 | Mastrangelo et al. |
| 2017/0226404 A1 | 8/2017 | Gupta |

(56) References Cited

U.S. PATENT DOCUMENTS

| | | |
|---|---|---|
| 2017/0350236 A1 | 12/2017 | Shen et al. |
| 2018/0134939 A1 | 5/2018 | Gupta et al. |

FOREIGN PATENT DOCUMENTS

| | | |
|---|---|---|
| EP | 1277051 B1 | 8/2006 |
| GB | 2298440 A | 9/1996 |
| GB | 2308129 A | 6/1997 |
| GB | 2520018 A | 5/2015 |
| WO | 97/45625 A1 | 12/1997 |
| WO | 99/36668 A1 | 7/1999 |
| WO | 99/54592 A1 | 10/1999 |
| WO | 200011949 A1 | 3/2000 |
| WO | 2001081914 A1 | 11/2001 |
| WO | 2002040827 A1 | 5/2002 |
| WO | 2004106942 A2 | 12/2004 |
| WO | 2005/017313 A1 | 2/2005 |
| WO | 2006129258 A1 | 12/2006 |
| WO | 2008032067 A1 | 3/2008 |
| WO | 2010007390 A2 | 1/2010 |
| WO | 2015174996 A1 | 11/2015 |
| WO | 2016014310 A1 | 1/2016 |
| WO | 2016089599 A1 | 6/2016 |
| WO | WO2016137922 A1 | 9/2016 |
| WO | 2019089043 A1 | 5/2019 |

OTHER PUBLICATIONS

P.J.C. Webb AEA Technology PLC, T.A., et al.; Economic and Technical Advantages of Revolutionary New Delivery System for Fractured and Gravel Packed Wells; SPE 38548; 1997.

P.J.C. Webb AEA Technology PLC, T.A., et al.; Economic and Technical Features of a Revolutionary Chemical Scale Inhibitor Delivery Method for Fractured and Gravel Packed Wells: Comparative Analysis of Onshore and Offshore Subsea Applications; SPE 39451; 1998.

Norris, et al.; Maintaining Fracture Performance Through Active Scale Control; SPE 68300; 2001.

Norris, et al.; Hydraulic Fracturing for Reservoir Management Production Enhancement, Scale Control and Asphaltine Prevention; SPE 71655; 2001.

McInnich, et al.; New Relationship Between Oil Company and Service Company Rejuvenates a Mature North Sea Gas Field; SPE 78327; 2002.

Szymczak, et al.; Long-Term Scale Inhibition Using a Solid Scale Inhibitor in a Fracture Fluid; SPE 102720; 2006.

Gupta, et al.; Solid Production Chemicals Added With the Frac for Scale, Paiaffin and Asphaltene Inhibition; SPE 119393; 2009.

Gupta, et al.; Multi-Year Scale Inhibition from a Solid Inhibitor Applied during Stimulation; SPE 115655; 2008.

Smith, et al; Solid Paraffin Inhibitor Pumped in a Hydraulic Fracture Provides Long-Term Paraffin Inhibition in Permian Basin Wells; SPE 124868; 2009.

Pallanich; Slow-release medication relieves deepwater headache; Offshore Engineer; Aug. 2007.

Szymczak et al; Treat production problems before they occur; E&P; Jul. 2008.

Weirich et al., Field Application of Chemically Treated Substrate in Pre-Packed Well Screen; SPE 141054; Society of Petroleum Engineers; Manama Bahrain, Mar. 2011.

Sasol Germany GmbH; "Boehmite, High Purity Alumina and Hydrotalcite"; Sasol Germany GmbH; Hamburg Germany, Aug. 2007.

SASOL; "Aluminum Oxide, A1203"; Material Safety Data Sheet; version 1.2; SASOL; Hamburg Germany; Aug. 2007.

Carbo Ceramics "Carbo EconoProp"; Carbo Ceramics; Houston, Texas; 2010.

D.M. Frigo et al; Chemical Inhibition of Halite Scaling in Topsides Equipment; SPE 60191; 2000.

Berlin et al., "Engineered Nanoparticles for Hydrocarbon Detection in Oil-Field Rocks," SPE 141528 Apr. 11, 2011 (in 2 parts).

Nyhavn, et al. "Permanent Tracers Embedded in Downhole Polymers Prove Their Monitoring Capabilities in a Hot Offshore Well," SPE 135070, Sep. 19, 2010.

Fuller, et al., Applying Biochemistry Concepts to the Analysis of Oilfield Produced Fluids, SPE 124749, Oct. 2009.

Optidose (TM) 1000 Traceable Polymer, a Tool for Maintaining Maximum Heat Transfer, Technical Data Sheet, Jul. 2012, The Dow Chemical Co.

Accent (TM) Traceable Scale Inhibitor System, Sep. 2010, The Dow Chemical Co., Jun. 2012.

Himes, et al., Search4Oil, Comparative Study of Flowback Analysis Using Polymer Concentrations and Fracturing-Fluid Tracer Methods: A Field Study, SPE 101614-PA, May 2008.

Liang, F., et al., "A comprehensive review on proppant technologies," Petroleum 2015, Nov. 5, 2015.

Frenier, W.W., et al., A Multifaceted Approach for Controlling Complex Deposits in Oil and Gas Production, Society of Petroleum Engineers, Sep. 22, 2010.

\* cited by examiner

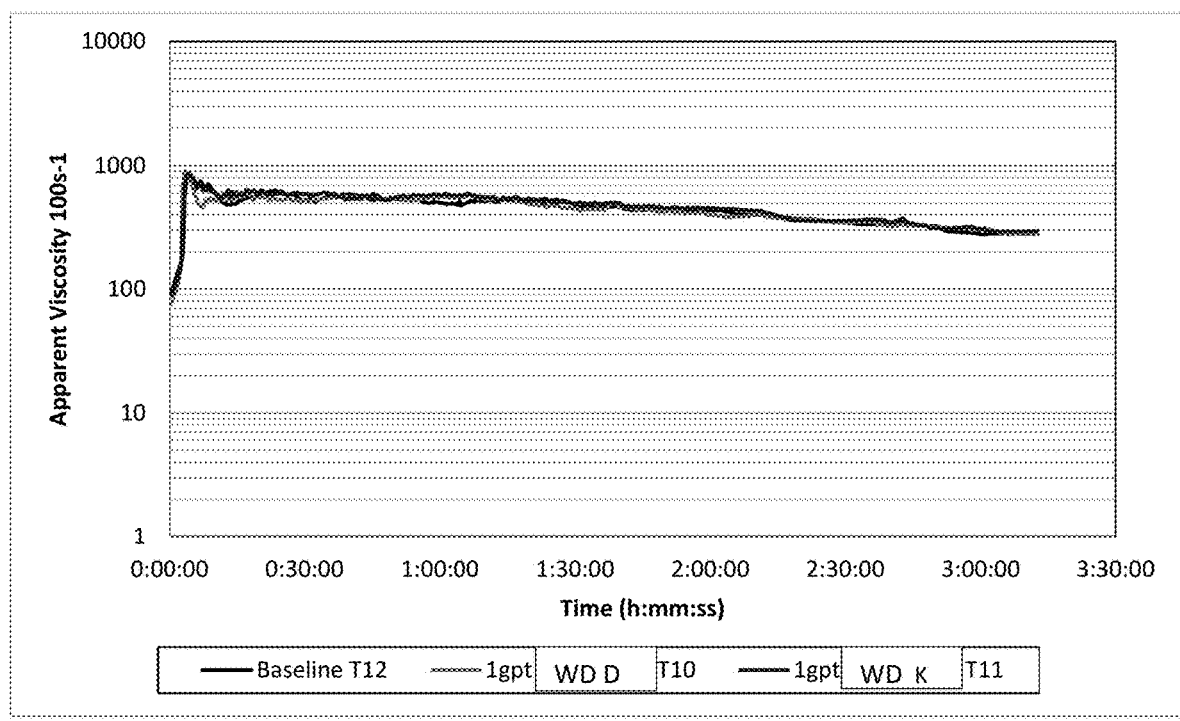

TREATMENT METHODS USING AQUEOUS FLUIDS CONTAINING OIL-SOLUBLE TREATMENT AGENTS

FIELD OF THE DISCLOSURE

The disclosure relates to methods of treating a well or a subterranean formation penetrated by a well with one or more oil-soluble, water-insoluble well treatment agents by pumping the treatment agent into the well in an aqueous dispersion. The disclosure further relates to a method of delivering such treatment agents into the well or formation in aqueous treatment fluids as well as hydrocarbon based fluids.

BACKGROUND OF THE DISCLOSURE

Fluids produced from oil and/or gas wells typically contain a complex mixture of components including aliphatic hydrocarbons, aromatics, hetero-atomic molecules, anionic and cationic salts, acids, sands, silts and clays. The nature of these fluids combined with the severe conditions of heat, pressure, and turbulence to which they are often subjected, are contributory factors to corrosion, paraffin deposition, and asphaltene precipitation as well as scale and salt formation in the well, subterranean formation penetrated by the well and equipment within the well.

Such contaminants typically restrict the movement of fluids in production piping and further plug flow paths of fluids (including reservoir flow paths). The formation and deposition of such contaminants typically decreases permeability of the subterranean formation, reduces well productivity, and, in some cases, completely blocks the tubing. In addition, such conditions shorten the lifetime of production equipment.

Further, asphaltenes adversely impact the viscosity and flow behavior of crude oil and are known to have deleterious effects on the extraction of oil. For instance, asphaltenes tend to precipitate at lower reservoir pressure or onset pressure; the precipitates blocking production routes and tubing. In addition, asphaltene precipitates flocculate and form deposits in the pores of the formation, coat boreholes and solidify in downhole equipment. Wells with excessive asphaltene deposition incur high remediation costs and are exposed to levels of formation damage that can greatly shorten the productive life of the well.

Well treatment agents are often used in production wells to prevent the deleterious effects caused by such deposits and precipitates. Water-soluble well treatment agents are usually delivered into the well as a component of an aqueous fluid.

A common method for delivering treatment agents into the well or formation is the technique of "downhole squeezing" wherein a slug of a well treatment composition is injected into the annulus of the well, using a pre-flush, squeeze, and over flush treatment before the well can be returned to normal function. Such slugs are typically aqueous fluids and downhole squeezing is usually limited to water-soluble well treatment agents. Further, this technique requires large volumes of treatment and flush fluid. Multiple treatments are typically required as the chemical residual is depleted, each requiring large volumes of flush and treatment pumped into the well. Such treatment methods are also typically inefficient in horizontal wells having large areas of perforated intervals since it is difficult to ensure the treatment is delivered to all of the intended areas. Further, the flush and chemical additives often require large pumps and holding tanks which can add significant costs to the application.

Solid chemical additives in the form of a slurry are further often used. This type of treatment is effective in vertical wells but requires a flush to aid in delivery of the treatment agent to the bottom of the well. In a deviated well such as a horizontal well or well with multiple deviations such as an "S" shaped completion, it is important that the slurry mass not be too heavy for the flush to be carried past the deviation. If the density of the slurry is too high, the slurry just settles beyond the deviation.

Capillary tubing lengths are frequently installed in wells to aid in delivery of a chemical treatment. This technique is effective in its intended function but is expensive and requires specialized equipment to install. Further, capillary tubing may not be able to extend to great depths if the deviation angle is severe or the piping extends far beyond the bend.

Other methods for introducing well treatment agents into production wells include forcing a liquid well treatment agent into a targeted zone of a formation by hydraulic pressure from the surface. In most cases, such treatments are performed at downhole injection pressures below that of the formation fracture pressure.

Alternatively, the delivery method may consist of placing the well treatment agent into a producing formation in conjunction with a hydraulic fracturing operation. This method is often preferred because it puts the treatment agent in contact with the fluids contained in the formation before such fluids enter the wellbore.

Conventional methods of delivering well treatment agents into the well are hampered when the well treatment agent is oil-soluble. Paraffin inhibitors and asphaltene inhibitors are typically oil-soluble. Since they are insoluble in water, such inhibitors are typically introduced into the well in an oil-based slug or slurry. The highly viscous nature of oil-soluble treatment agents restricts the amount of the treatment agent that can be delivered in a slug or slurry. Typically, when present in a slug, the amount of oil-soluble treatment agent is no more than 10 to 15 weight percent of the total weight of the slurry or slug. Slugs containing more than 10 to 15 weight percent of oil-soluble treatment agent are not pumpable.

Alternative methods of delivering oil-soluble well treatment agents agent into the well and/or formation are needed.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

SUMMARY OF THE DISCLOSURE

In an embodiment of the disclosure, a method of treating a well or a subterranean formation penetrated by a well is provided by pumping into the well an aqueous treatment fluid comprising at least one oil-soluble, water-insoluble well treatment agent having a volume average particle diameter less than or equal to 2 microns, preferably less than or equal to 0.2 microns. The oil-soluble, water-insoluble well treatment agent, when pumped into the well, is a component of an aqueous dispersion composition. The aqueous dispersion composition comprises (i) the oil-soluble, water-insoluble well treatment agent dispersed in water, and (ii) a dispersing agent. The aqueous dispersion composition may further contain a water-soluble well treatment agent such as one or more of the group consisting of scale inhibitors, corrosion inhibitors, salt inhibitors, biocides, or a combination thereof. The amount of oil-soluble, water-insoluble well treatment agent in the aqueous dispersion composition is from about 25 to about 60 weight percent. The amount of aqueous dispersion composition in the aqueous treatment fluid is from about 1 to about 5 gallons per thousand gallons of aqueous treatment fluid.

In another embodiment, a method of treating a well or a subterranean formation penetrated by a well is provided wherein an aqueous treatment fluid comprising an oil-soluble, water-insoluble well treatment agent is pumped into the well. The oil-soluble, water-insoluble well treatment agent may be selected from the group consisting of paraffin inhibitors, corrosion inhibitors, asphaltene inhibitors and mixtures thereof. The oil-soluble, water-insoluble well treatment agent, when pumped into the well, is a component of an aqueous dispersion composition. The aqueous dispersion may contain (i) the oil-soluble, water-insoluble well treatment agent dispersed in water and (ii) a dispersing agent. The aqueous dispersion may further contain a water-soluble well treatment agent such as one or more of the group consisting of scale inhibitors, corrosion inhibitors, salt inhibitors, biocides, or a combination thereof. The amount of oil-soluble, water-insoluble well treatment agent in the aqueous dispersion composition is typically between from about 25 to about 60 weight percent.

In another embodiment, a method of treating a subterranean formation penetrated by a wellbore is provided wherein an aqueous dispersion composition is pumped into the well; the aqueous dispersion comprising (a) a dispersing agent, (b) an oil-in-water dispersion of an oil-soluble, water-insoluble well treatment agent dispersed in water and (c) a water-soluble well treatment agent. The oil-soluble, water-insoluble well treatment agent may be selected from the group consisting of paraffin inhibitors, asphaltene inhibitors, corrosion inhibitors and mixtures thereof. The water-soluble well treatment agent may be selected from the group consisting of paraffin inhibitors, asphaltene inhibitors, corrosion inhibitors, scale inhibitors, salt inhibitors, biocides and mixtures thereof. The volume average particle diameter of the oil-soluble, water-insoluble well treatment agent in the aqueous dispersion composition is typically less than or equal to 2 microns, preferably less than or equal to 0.2 microns. The amount of oil-soluble, water-insoluble well treatment in the aqueous dispersion composition is preferably between from about 25 to about 60 weight percent. The amount of water-soluble well treatment in the aqueous dispersion composition is typically between from about 0.01 to about 50 weight percent.

BRIEF DESCRIPTION OF THE DRAWINGS

The following FIGURES are part of the present specification, included to demonstrate certain aspects of various embodiments of this disclosure and referenced in the detailed description herein:

FIG. 1 illustrates the compatibility of sub-micron sized particles of an oil-soluble treatment agent in an aqueous treatment fluid.

DETAILED DESCRIPTION OF THE PREFERRED EMBODIMENTS

Characteristics and advantages of the present disclosure and additional features and benefits will be readily apparent to those skilled in the art upon consideration of the following detailed description of exemplary embodiments and referring to the accompanying figure. It should be understood that the description herein and appended figure, being of exemplary embodiments, is not intended to limit the claims of this patent or any patent or patent application claiming priority hereto.

As used herein and throughout various portions (and headings) of this patent application, the terms "disclosure", "present disclosure" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference.

This document does not intend to distinguish between components that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

Each numerical value may be read as being modified by the term "about" as well as being read by not being modified by the term "about". It is intended that a range listed or described as being useful, suitable, or the like, includes each and every number within the range, including the end points. For example, "a range of from 1 to 10" is to be read as indicating each and every possible number along the continuum from about 1 to about 10. Thus, even if specific data points within the range are explicitly identified or refer to only a few specific data points, it is to be understood that each and all data points defined by the range are considered to have been specified.

The aqueous treatment fluids disclosed include an aqueous dispersion. One or more oil-soluble inhibitors are in the aqueous dispersion.

As used herein, the term "oil-soluble well treatment agent" shall include an oil-soluble, water-insoluble treatment agent. As used herein, the term "water-soluble well treatment agent" shall include an oil-insoluble, water-soluble well treatment agent. Oil-soluble and water-soluble treatment agents inhibit the formation of contaminants, control the formation of contaminants as well as retard the release of contaminants into the well.

The aqueous fluid includes one or more oil-soluble, water-insoluble well treatment agents in an aqueous dispersion composition. In addition, the aqueous dispersion composition may contain a dispersing agent.

The amount of the oil-soluble well treatment agent(s) in the aqueous dispersion composition is typically from about 25 to about 60 weight percent. In an embodiment, the dispersion contains between from about 20 to about 35 weight percent of oil-soluble well treatment agent.

The small particle size distribution and volume average particle size of the oil-soluble well treatment agent enables delivery of the treatment agent into the well or formation in an aqueous fluid and enables a greater amount of treatment agent to be delivered into a targeted area of the well or formation (when compared to conventional methods of delivering the oil-soluble treatment agent into the well or formation in an oil-based fluid). In the conventional method, oil-soluble well treatment agent(s) are introduced into the well or formation in oil. The viscosity of the fluid is a limiting factor on how much active well treatment agent(s) can be pumped.

The aqueous fluid may further contain one or more water-soluble well treatment agents. The well treatment agents in the aqueous treatment fluid further remove contaminants from or control the formation of contaminants onto tubular surface equipment within the wellbore.

The oil-soluble well treatment agent is the dispersed component of the aqueous dispersion composition. As such, the particle size distribution [defined as volume average particle diameter (Dv) divided by number average particle diameter (Dn)] of the oil-soluble treatment agent in the well treatment fluid is equal to or less than 2.5 microns (μm), preferably equal to or less than 2.0. In other embodiments, the dispersions have a particle size distribution of less than or equal to 1.9, 1.7 or 1.5.

A preferred volume average particle size is equal to less than 2 microns, preferably equal to or less than 1.5 μm, preferably equal to or less than 1.2 μm, and more preferably equal to or less than 1 μm. In other embodiments, the average particle size ranges from 0.05 μm to 1 μm. In still other embodiments, the average particle size ranges from 0.5 μm to 1.2 μm, preferably 0.5 μm to 1 μm and more preferably less than or equal to 0.2 microns. For particles that are not spherical the diameter of the particle is the average of the long and short axes of the particle. Particle sizes can be measured on a Coulter LS230 light-scattering particle size analyzer or another suitable device.

The oil-soluble well treatment agent is typically a paraffin inhibitor, an asphaltene inhibitor, a corrosion inhibitor, an oil-soluble scale inhibitor or a combination thereof.

The dispersing agent aids in the formation and/or stabilization of the aqueous dispersion. Suitable dispersing agents are anionic, cationic, zwitterionic or non-ionic surfactants.

Anionic surfactants include substances containing a lipophilic tail bonded to a water-soluble (hydrophilic) group; the hydrophilic group containing an anionic moiety such as a carboxylic acid, sulfonic acid, or phenolic group, neutralized by a cation such as an alkali metal or ammonium. The lipophilic tail is preferably an alkyl group, typically having about 8 to about 25 carbon atoms. Typical anionic surfactants include carboxylic acids or salts thereof such as fatty acids/salts having the formula $R_1COOR_2$ wherein $R_1$ is a straight chain, saturated or unsaturated, hydrocarbon radical of about 8 to about 25 carbon atoms and $R_2$ is —H or a base-forming radical such as Li, Na, K, or $NR_4$ (R is independently hydrogen, alkyl, aryl or arylalkyl). Alternatively, $R_2$ may be a divalent or polyvalent metal, the number of acid groups being that necessary to provide the neutral salt. Valent metal ions include Mg, Ca, Sr, Ba, Cr, Mn, Fe, Co, Ni, Cu, Zn, Sn as well as Pb. Typical fatty acid salts include sodium stearate, sodium palmitate, ammonium oleate, and triethanolamine palmitate. Additional carboxylic acids/salts useful as anionic surfactants include acids/salts, and especially sodium and potassium salts, of coconut oil fatty acids and tall oil acids as well as other carboxylic acids salt compounds including amine salts such as triethanolamine salts, acylated polypeptides, and salts of N-lauryl sarcosine such as N-dodecanoyl-N-methylglycine sodium salt. Preferred dispersing agents are behenic acid, erucic acid, sodium or potassium salts of oleic acid, stearic acid, behenic acid or erucic acid and/or mixtures thereof. Erucic acid may be in the form of rapeseed oil, a natural oil that contains approximately 40 to 50 weight percent erucic acid with the remainder consisting primarily of chains having 18 carbon atoms.

Other anionic surfactants include alkyl, arene and alkylarene sulfonates such as alkylbenzene sulfonate, linear alkylbenzene sulfonates, sodium tetrapropylene benzene sulfonate, sodium dodecylbenzene sulfonate, benzene-, toluene-, xylene-, and cumene sulfonates, lignin sulfonates, petroleum sulfonates, paraffin sulfonates, secondary n-alkanesulfonates, alpha-olefin sulfonates, alkylnaphthalene sulfonates; n-acyl-n-alkyltaurates; sulfosuccinate esters; isothionates; alkyl sulfates of the formula $R_2SO_4R_1$ or alkyl sulfonates of the formula $R_1SO_3R_2$ wherein $R_1$ and $R_2$ are as defined above, such as lithium dodecyl sulfate, sodium dodecyl sulfate, potassium dodecyl sulfate, and sodium tetradecyl sulfate; such as sodium lauryl sulfonate; sulfated and sulfonated amides and amines; sulfated and sulfonated esters such as lauric monoglyceride sodium sulfate, sodium sulfoethyl oleate, and sodium lauryl sulfoacetate; sulfuric acid ester salts such as sulfated linear primary alcohols, sulfated polyethoxylated straight chain alcohols and sulfated triglyceride oils; phosphoric and polyphosphoric acid esters; perfluorinated carboxylic acids; and polymeric anionic surfactants such as alginic acids.

Also included are polymeric anionic surfactants such as salts of polymers of alkyl acrylates and/or alkyl methacrylates and acrylic and/or methacrylic acid, and salts of partial esters of maleic anhydride-styrene copolymers. An anionic surfactant may be the salt of an acid precursor reacted with a basic material to form the salt. Preferably, the acid precursor is neutralized in situ to form the salt.

Other anionic surfactants are overbased or superbased materials, i.e., basic metal salts, preferably alkali or alkaline earth metal salts, of acidic organic compounds (carboxylic acids, sulfonic acids, phosphonic acids, phenols, etc.). Overbased materials are generally single phase, homogeneous Newtonian systems characterized by a metal content more than that present for neutralization based on the stoichiometry of the metal and the acidic organic compound reacted with the metal. Suitable overbased or superbased materials may be those set forth in U.S. Pat. Nos. 2,501,731; 2,616,905; 2,616,911; 2,616,925; 2,777,874; 3,256,186; 3,384,585; 3,365,396; 3,320,162; 3,318,809; 3,488,284; and 3,629,109.

Exemplary cationic surfactants are long-chain amines and their salts; such as primary amines derived from animal and vegetable fatty acids and tall oil and synthetic $C_{12}$ to $C_{18}$ primary, secondary, or tertiary amines; diamines and their salts, quaternary ammonium salts including tetraalkylammonium salts and imidazolinium salts derived from e.g. tallow or hydrogenated tallow, or N-benzyl-N-alkyl-dimethylammonium halides; polyethoxylated long-chain amines; quaternized polyethoxylated long-chain amines; and amine oxides such as N-alkyldimethylamine oxides such as cetyl dimethylamine oxide or stearyl dimethylamine oxide.

Exemplary zwitterionic surfactants include amino acids such as beta-N-alkylamino-propionic acids, N-alkyl-beta-iminodipropionic acids, imidazoline carboxylates, N-alkyl-betaines, sulfobetaines, and sultaines.

Exemplary nonionic surfactants include polyethoxylated alkylphenols such as polyethoxylated p-nonylphenol, p-octylphenol, or p-dodecylphenol; polyethoxylated straight-chain alcohols derived from coconut oil, tallow, or synthetic materials including oleyl derivatives; polyethoxylated polyoxypropylene glycols (block copolymers of ethylene oxide and propylene oxide), typically having molecular weights of 1000 to 30,000; polyethylene glycol; polyethoxylated mercaptans; long-chain carboxylic acid esters including glyceryl and polyglyceryl esters of natural fatty acids, propylene glycol esters, sorbitol esters, polyethoxylated sorbitol esters, polyoxyethylene glycol esters, and polyethoxylated fatty acids; alkanolamine condensates, such as the condensates made by reaction of methyl or triglyceride esters of fatty acids with equimolar or twice equimolar amounts of alkanolamine; tertiary acetylenic glycols; polyethoxylated silicones, prepared by reaction of a reactive silicone intermediate with a capped allyl polyalkylene oxide such as propylene oxide or mixed ethylene oxide/propylene oxide copolymer; N-alkylpyrrolidones, and alkylpolyglycosides (long chain acetals of polysaccharides). Further nonionic surfactants include ethoxylated coco amide; oleic acid; t-dodecyl mercaptan; modified polyester dispersants; ester, amide, or mixed ester-amide dispersants based on polyisobutenyl succinic anhydride; dispersants based on polyisobutyl phenol; ABA type block copolymer nonionic dispersants; acrylic graft copolymers; octylphenoxypolyethoxyethanol; nonylphenoxypolyethoxyethanol; alkyl aryl ethers; alkyl aryl polyethers; amine polyglycol condensates; modified polyethoxy adducts; modified terminated alkyl aryl ethers; modified polyethoxylated straight chain alcohols; terminated ethoxylates of linear primary alcohols; high molecular weight tertiary amines such as 1-hydroxyethyl-2-alkyl imidazolines; oxazolines; perfluoralkyl sulfonates; sorbitan fatty acid esters; polyethylene glycol esters; aliphatic and aromatic phosphate esters. Also included are the reaction products of hydrocarbyl-substituted succinic acylating agents and amines. Also included amongst nonionic surfactants are functionalized polysiloxanes containing amino, amido, imino, sulfonyl, sulfoxyl, cyano, hydroxy, hydrocarbyloxy, mercapto, carbonyl (including aldehydes and ketones), carboxy, epoxy, acetoxy, phosphate, phosphonyl, and haloalkyl groups. Such polysiloxanes can be linear or branched and generally have molecular weight above 800, typically up to 20,000. The functionality can be randomly distributed on the polymer chain or present in blocks. The functionality can be present as alkyl or alkylaryl groups as well as groups such as —$(C_2H_4O)_a$—$(C_3H_6O)_b$—R where a and b are independently numbers from 0 to about 100 provided that at least one of a or b is at least 1, and R is H, acetoxy, or a hydrocarbyl group. Other suitable substituent groups include $C_3H_6X$, where X is OH, SH, or $NH_2$. Suitable nonionic surfactants further include polyoxyalkenealkyl alcohols or phenols, such as ethoxylated nonylphenol; alkanoates (preferably partial alkanoates) of polyalcohols, such as glyceryl monooleate, glyceryl monolaurate, sorbitan monooleate, sorbitan sesquioleate, sorbitan monolaurate, and sorbitan sesquilaurate, and 4,4-bishydroxylmethyl-2-heptadecenyl-2-oxazoline. Preferred materials include tall oil fatty acid neutralized with diethanolamine; polyoxyalkyene oxide octylphenols having from 1 to 70 ethylene oxide units and nonylphenols with 4 to 40 ethylene oxide units. The foregoing commercial materials are generally linear primary alcohol ethoxylates, secondary alcohol ethoxylates, or branched alkylphenol ethoxylates.

Preferably the dispersing agent in the aqueous dispersion composition is 1 weight percent or higher, more preferably 2 weight percent or higher and more preferably 3 weight percent or higher based on the total weight of the aqueous dispersion composition. Preferably the amount of dispersing agent in the aqueous dispersion is 10 weight percent or less, more preferably 9 weight percent or less, and more preferably 8 weight percent or less based on the total weight of the aqueous dispersion composition.

The aqueous dispersion composition optionally contains a stabilizing agent to maintain product stability. Preferably, the dispersion is stable between 40° C. and −40° C. The stabilizing agent may also provide shear stability protection to allow the product to be transferred via a number of different pumping systems. Suitable stabilizing agents may be monomeric surfactants, polymeric stabilizing agents, and/or mixtures thereof.

Preferred monomeric stabilizers are polyethoxylated nonionic surfactants. Most preferred are those having hydrophilic lipophillic balance (HLB) values of equal to or less than 16, more preferably HLB values equal to or less than 12, and most preferably those having HLB values equal to or less than 10.

A preferred nonionic surfactant as stabilizing agent contains a hydrophobic part comprising hydrocarbyl groups and a hydrophilic part containing ethoxy groups. The preferred surfactant has a hydrophobic part that is either free of a phenolic group and contains 6 to 12 (more preferably 8 to 11) carbon atoms or that contains a phenolic group that is connected to 8 or 9 carbon atoms (an octyl phenol or nonyl phenol, respectively) and the preferred surfactant has a hydrophile that contains 1 to 6 ethoxy groups (more preferably 2 to 4).

Other polymeric stabilizers include polyvinyl alcohol or ionomers and/or salts of ethylene acrylic acid copolymers, ethylene methacrylic acid copolymers, polyacrylic acid polymers and co-polymers and associative types of acrylic and urethane co-polymers. The preferred polymeric stabilizers are polyacrylic polymers and ethylene acrylic acid copolymers.

The amount of stabilizing agent is typically from about 0.5 weight percent to 10 weight percent based on the total weight of the aqueous dispersion composition. More preferably from about 0.5 weight percent to 7 weight percent, and even more preferably from 0.5 weight percent to 5 weight percent based on the total weight of the aqueous dispersion composition.

The aqueous dispersion composition may be a dispersion in a liquid medium, preferably comprising water, in which it is not normally soluble at 10° C., and preferably also not soluble at ambient temperature, i.e., about 20° C., or even 30° C. or 40° C. The medium is preferably, first, a liquid at ambient temperature and preferably has a freezing point of 10° C. or below. Some preferred media have freezing points as low as 0° C., −20° C., −30° C., −40° C. or below. Moreover, the medium does not dissolve a substantial amount of the oil-soluble well treatment agent at such temperatures, preferably, ambient temperature. More specifically, the medium preferably dissolves less than 4 weight percent, more preferably less than 2 or even 1 weight percent, of the oil-soluble well treatment agent at ambient temperature or moderately elevated temperatures. (In some cases, the amount of actual oil-soluble well treatment agent which dissolves is less than 0.5 weight percent.) Preferably the medium remains a non-solvent to 30° C. or more preferably to 40° C. or 50° C. or higher.

For the liquid medium to be a nonsolvent for the oil-soluble well treatment agent, the medium should generally have a suitable degree of polarity. In one embodiment, the molecules of the solvent will preferably have 10 to 80 percent by weight heteroatoms such as oxygen or nitrogen, more preferably 20 to 70 percent, and still more preferably 25 to 60 percent by weight. Alternatively, the medium may have a dielectric constant of at least 3, preferably at least 10.

The liquid medium of the dispersion composition may be water. As defined herein, aqueous means containing, dissolved in, or dispersed in water. The aqueous dispersion composition is preferably hydrocarbon solvent-free. The carrier fluid may be salt water, fresh water, a brine such as a saturated potassium chloride or sodium chloride solution.

Suitable liquid media may also include acetates (e.g., 2-ethoxyethyl acetate), ketones (e.g., acetone, butanone, pentanone, hexanone), or preferably, aqueous glycol mixtures (e.g., mixtures of ethylene glycol and water). Among the materials which can be used alone or in combination with water are ethylene glycol and its derivatives, such as the monomethyl ether, the monoethyl ether, the monopropyl ether, the monobutyl ether, and the monohexyl ether; diethylene glycol and its derivatives, such as the monomethyl ether, the monoethyl ether, the monopropyl ether, the monobutyl ether, and the monohexyl ether; propylene glycol and its derivatives, including the monomethyl ether, the monopropyl ether, and the monobutyl ether; and dipropylene glycol and its derivatives, such as the monomethyl ether, the monopropyl ether, and the monobutyl ether. Other suitable types of materials useful as the liquid medium for the present invention include lactones such as butyrolactone, and alcohols such as butanol, diacetone alcohol (4-hydroxy-4-methyl-2-pentanone) 2,6-dimethyl-4-heptanol, hexanol, isopropanol, 2-ethylhexanol, and 1-pentanol.

Where it is advantageous to have an aqueous dispersion with a freezing point equal to or less than 0° C., preferably equal to or less than –10° C., more preferably equal to or less than –20° C., more preferably equal to or less than –30° C., more preferably equal to or less than –40° C., and even more preferably equal to or less than –50° C., a freezing point depressant may be included. Such depressants include sodium chloride, potassium chloride, calcium chloride, etc.; monohydric alcohols such as methanol, ethanol, propanol, etc.; polyhydric alcohols such as ethylene glycol, propylene glycol and glycerine, etc.; glycol ethers such as ethyl, propyl, butyl, and hexyl ethers of ethylene glycol; diethylene glycol; propylene glycol, etc.

The amount of freezing point depressant incorporated in the aqueous dispersion composition is dependent on the desired freezing point of the aqueous dispersion composition. In general, one or more such freezing point depressants can be used in an amount equal to or greater than 5 weight percent, preferably equal to or greater than 10 weight percent, and more preferably equal to or greater than 15 weight percent based on the final weight of the aqueous dispersion composition.

The liquid medium can also be a mixture of any of the foregoing materials, including mixtures with water, as long as the pour point depressant is substantially insoluble in such mixtures. If the liquid medium is a mixture of a glycol and water, the relative amounts of the materials are such that the water component will not freeze even at low temperatures such as 0° C. to –40° C. Preferred weight ratios for such water:glycol mixtures are: 40:60, 50:50, 60:40 to 70:30.

Preferably the amount of liquid medium in aqueous dispersion composition is an amount equal to or greater than 35 weight percent, more preferably in an amount equal to or greater than 40 weight percent, and more preferably in an amount equal to or greater than 45 weight percent based on the total weight of the aqueous dispersion composition. Preferably the liquid medium is in an amount equal to or less than 75 weight percent, more preferably in an amount equal to or less than 70 weight percent, and more preferably in an amount equal to or less than 65 weight percent based on the total weight of the aqueous dispersion composition.

Suitable aqueous dispersion compositions are those set forth in U.S. Patent Publication No. 2015/0369822, herein incorporated by reference.

Suitable oil-soluble paraffin inhibitors include acrylates and methacrylates with pendant groups of $C_{16}$ to $C_{50}$, as well as polymers with long repeating saturated carbon chain segments such as ethylene vinyl acetate copolymers. These include but are not limited to acrylate or methacrylate esters of long chain alcohols, long chain alcohol esters of maleic acid, long chain fatty acid esters of acrylate and methacrylate polymers, maleic olefin alkyl esters, and ethylene vinyl acetate polymers of varying molecular weights. Further, oil-soluble paraffin inhibitors include those having oil-soluble polar compounds containing ionic or polar groups, for example amine salts and/or amides, which can be obtained by reaction of aliphatic or aromatic amines, preferably long-chain aliphatic amines, with aliphatic or aromatic mono-, di-, tri- or tetracarboxylic acids or anhydrides thereof. Copolymers, terpolymers and tetrapolymers are also contemplated.

Other oil-soluble paraffin inhibitors include copolymers of maleic anhydride and alpha, beta-unsaturated compounds, which may be reacted with primary monoalkylamines and/or aliphatic alcohols, the products of the reaction of alkenylspirobislactones with amines and products of the reaction of terpolymers based on alpha, beta-unsaturated dicarboxylic anhydrides, alpha, beta-unsaturated compounds and polyoxyalkylene ethers of lower unsaturated alcohols. Alkylphenol-formaldehyde resins are also suitable as oil-soluble paraffin inhibitors.

Preferred oil-soluble paraffin inhibitors include ethylene vinyl acetate copolymers, maleic olefin alkyl esters, acrylate esters, methacrylic esters, and mixtures thereof including homopolymers and copolymers of $C_6$-$C_{24}$ linear esters of acrylic and methacylic acids and $C_{20}$ alpha olefin-maleic copolymers esters of $C_{16}$-$C_{24}$ linear alcohols and $C_{16}$-$C_{28}$ para-substituted phenol formaldehyde resins.

Most preferred are polymeric oil-soluble paraffin inhibitors such as those selected from ethylene/vinyl acetate copolymers, homopolymers and copolymers of acrylate esters, phenol-aldehyde resins, and olefin/maleic esters copolymers.

Most preferred are copolymers of ethylene with at least one vinyl ester of a saturated aliphatic $C_1$ to $C_{24}$ carboxylic acid. See for example, U.S. Pat. No. 3,382,055. In such polymers, different vinyl esters can concurrently be used. Suitable comonomers include vinyl esters of acetic acid, propionic acid, butyric acid, 2-ethylhexane carboxylic acid, pelargonic acid, and stearic acid, particularly $C_2$ to $C_4$ carboxylic acids, and especially vinyl acetate.

A preferred thermoplastic polymer is an ethylene vinyl acetate copolymer wherein the vinyl ester content is from about 10 to about 80 percent, preferably from about 20 to about 45 percent, more preferably from about 25 to about 32 percent, more preferably from about 28 to about 32 percent by weight.

Copolymers having from 3 to 20 molar parts of ethylene per molar part of vinyl acetate, having a molecular weight of 1,000 to 2,900, having a slight degree of branching of the ethylene chains, and may prepared by free radical solution polymerization. The melt viscosity index, ASTM D 1238-6 T (at 190° C. and a load of 2.16 kg), is between 1 and 800 grams per 10 minutes (g/10 min), preferably 5 to 400 g/10 min, more preferably 5 to 150 g/10 min. Commercially available ethylene vinyl acetate copolymers comprising 2 to 45 percent by weight of vinyl acetate and having a melt viscosity index of 6 to 150 g/10 min, such as are sold under the name ELVAX®, from E. I. Du Pont de Nemours and Company, may be used.

Exemplary oil-soluble asphaltene inhibitors include, but not limited to, fatty ester homopolymers and copolymers (such as fatty esters of acrylic and methacrylic acid polymers and copolymers) and sorbitan monooleate. Further exemplary asphaltene inhibitors include but are not limited to, basic iron salts of organic acids, mixtures of iron hydroxide and a basic calcium soap, basic and oil-soluble magnesium salts of sulfonic acids, succinimides, optionally in combination with oil-soluble carbonyl manganese compounds and/or a neutral or basic alkali metal salt or alkaline earth metal salt of an organic acid component, as well as alkoxylated fatty amines and fatty amine derivatives, optionally in combination with an organic metal salt.

Exemplary oil-soluble corrosion inhibitors include thiazoles, triazoles and thiadiazoles. Examples of such compounds include benzotriazole, tolyltriazole, octyltriazole, decyltriazole, dodecyltriazole, 2-mercaptobenzothiazole, 2,5-dimercapto-1,3,4-thiadiazole, 2-mercapto-5-hydrocarbylthio-1,3,4-thiadiazoles, 2-mercapto-5-hydrocarbyldithio-1,3,4-thiadiazoles, 2,5-bis(hydrocarbylthio)-1,3,4-thiadiazoles, and 2,5-(bis)hydrocarbyldithio)-1,3,4-thiadiazoles.

Other types of oil-soluble corrosion inhibitors are dimer and trimer acids, such as are produced from tall oil fatty acids, oleic acid, and linoleic acid. Another useful type of corrosion inhibitor for use in the practice of this invention are the alkenyl succinic acid and alkenyl succinic anhydride corrosion inhibitors such as, for example, tetrapropenylsuccinic acid, tetrapropenylsuccinic anhydride, tetradecenylsuccinic acid, tetradecenylsuccinic anhydride, hexadecenylsuccinic acid and hexadecenylsuccinic anhydride. Also useful are the half esters of alkenyl succinic acids having 8 to 24 carbon atoms in the alkenyl group with alcohols such as the polyglycols. Other suitable corrosion inhibitors include aminosuccinic acid derivatives; ether amines; acid phosphates; amines; polyethoxylated compounds such as ethoxylated amines, ethoxylated phenols, and ethoxylated alcohols; imidazolines.

Suitable oil-soluble scale inhibitors include sulfonated acrylate copolymers added to organic solvents, blends of phosphonates (like ATMP, DTPMP etc.) with tertiary amines, like 2-ethyl hexyl amine etc.

The amount of oil-soluble well treatment agent in the aqueous dispersion composition is generally 20 weight percent or greater, more preferably in an amount equal to or greater than 25 weight percent or greater, and more preferably in an amount equal to or greater than 30 weight percent or greater, based on the total weight of the aqueous dispersion composition. Preferably, the oil-soluble well treatment agent in the aqueous dispersion composition is an amount equal to or less than 65 weight percent, more preferably in an amount equal to or less than 60 weight percent, and more preferably in an amount equal to or less than 55 weight percent based on the total weight of the aqueous dispersion composition.

The aqueous dispersion typically has a pH of from about 5 to about 13.5, preferably from about 8 to about 13, more preferably from about 10 to about 12.

The aqueous treatment fluid may further contain a water-soluble well treatment agent. In a preferred embodiment, the water-soluble well treatment is a component of the dispersion. Thus, instead of introducing two different fluids into the well, i.e., one containing the oil-soluble well treatment agent and a second containing the water-soluble well treatment agent, a single fluid may be introduced into the well; the single fluid containing both oil-soluble well treatment agent(s) and water-soluble well treatment agent(s).

In a preferred embodiment, the water-soluble well treatment agent may be a corrosion inhibitor, scale inhibitor, paraffin inhibitor, gas hydrate inhibitor, salt formation inhibitor as well as mixtures thereof. The well treatment agent may thus be used to control and/or prevent the undesired formation of salts, paraffins, gas hydrates, asphaltenes as well as corrosion in formations or on surface equipment.

Further, other suitable water-soluble well treatment agents may be foaming agents, oxygen scavengers, demulsifying agents (both water-in-oil and oil-in-water), hydrogen sulfide, biocides, and surfactants as well as other agents wherein slow release of an inhibitor into a production well is desired.

Suitable well treatment agents as scale inhibitors are anionic.

Preferred well treatment agents include strong acidic materials such as a phosphonic acid, a phosphoric acid or a phosphorous acid, phosphate esters, phosphonate/phosphonic acids, the various aminopoly carboxylic acids, chelating agents, and polymeric inhibitors and salts thereof. Included are organo phosphonates, organo phosphates and phosphate esters as well as the corresponding acids and salts thereof.

Phosphonate/phosphonic acid type well treatment agents are often preferred in light of their effectiveness to control scales at relatively low concentration. Polymeric well treatment agents, such as polyacrylamides, salts of acrylamidomethyl propane sulfonate/acrylic acid copolymer (AMPS/AA), phosphinated maleic copolymer (PHOS/MA) or sodium salt of polymaleic acid/acrylic acid/acrylamidomethyl propane sulfonate terpolymers (PMA/AMPS), are also effective. Sodium salts are preferred.

Further, the scale inhibitor may be an amino trimethylene phosphonic acid (ATMP), 1-hydroxy ethylidene-1,1-diphosphonic acid (HEDP), 2-phosphonobutane-1,2,4-(tricarboxylic acid (PBTC), 2-hydroxyethyl-amino-bis(methylenephosphonic acid (HEAMBP), ethylene diamine tetrakis (methylene phosphonic acid) (EDTMP), tetramethylenediamine-tetrakis-(methylene phosphonic acid) (TDTMP), hexamethylene diamine tetrakis (methylene phosphonic acid) (HDTMP), 2-hydroxy phosphonoacetic acid (HPAA), diethylene triamine penta(methylene phosphonic acid) (DTPMP), bis (hexamethylene triamine penta (methylene phosphonic acid) (BHPMP), polyamino polyether methylene phosphonate (PAPEMP) or a salt thereof; phosphinopolycarboxylate (PPCA), polyacrylate (PAA), polymaleic acid (PMA), an acrylic copolymer, sulfonate polyacrylate co-polymer, polyvinyl sulfonate, carboxymethyl inulin, polyaspartates and mixtures thereof.

Further useful, especially for brines, are chelating agents, including diethylenetriaminepentamethylene phosphonic acid and ethylenediaminetetra-acetic acid.

The well treatment agent may further be a salt inhibitor. Suitable salt inhibitors are those fructans or fructan derivatives, such as inulin and inulin derivatives, as disclosed in U.S. Pat. No. 7,977,283, herein incorporated by reference. Other suitable salt inhibitors include potassium ferrocyanide, nitrilotriacetic acid and nitrilotriacetamide.

Exemplary water-soluble corrosion inhibitors include but are not limited to, fatty imidazolines, alkyl pyridines, alkyl pyridine quaternaries, fatty amine quaternaries and phosphate salts of fatty imidazolines.

Exemplary gas hydrate inhibitors include, but not limited to, polymers and homopolymers and copolymers of vinyl pyrrolidone, vinyl caprolactam and amine based hydrate inhibitors such as those disclosed in U.S. Patent Publication Nos. 2006/0223713 and 2009/0325823, both of which are herein incorporated by reference.

Exemplary demulsifying agents are condensation polymers of alkylene oxides and glycols, such as ethylene oxide and propylene oxide condensation polymers of di-propylene glycol as well as trimethylol propane; and alkyl substituted phenol formaldehyde resins, bis-phenyl diepoxides, and esters and diesters of the such di-functional products. Especially preferred as non-ionic demulsifiers are those prepared from a well treatment agent selected from oxyalkylated phenol formaldehyde resins, oxyalkylated amines and polyamines, di-epoxidized oxyalkylated polyethers, etc. Suitable oil-in-water demulsifiers include poly triethanolamine methyl chloride quaternary, melamine acid colloid, aminomethylated polyacrylamide etc.

Suitable foaming agents are oxyalkylated sulfates or ethoxylated alcohol sulfates, or mixtures thereof.

Exemplary surfactants are cationic, amphoteric, anionic, and nonionic surfactants. Included as cationic members are those containing a quaternary ammonium moiety (such as a linear quaternary amine, a benzyl quaternary amine or a quaternary ammonium halide), a quaternary sulfonium moiety or a quaternary phosphonium moiety or mixtures thereof. Suitable well treatment agents joined with a taggant to form a surfactant include a quaternary group include quaternary ammonium halide or quaternary amine, such as quaternary ammonium chloride or a quaternary ammonium bromide. Included as amphoteric surfactants are those prepared by joining a taggant with glycinates, amphoacetates, propionates, betaines, and mixtures thereof. The cationic or amphoteric surfactant may have a hydrophobic tail (which may be saturated or unsaturated) such as a $C_{12}$-$C_{18}$ carbon chain length. Further, the hydrophobic tail may be obtained from a natural oil from plants such as one or more of coconut oil, rapeseed oil and palm oil.

Preferred surfactants include N,N,N trimethyl-1-octadecammonium chloride: N,N,N trimethyl-1-hexadecammonium chloride; and N,N,N trimethyl-1-soyaammonium chloride, and mixtures thereof. Suitable anionic surfactants are sulfonates (like sodium xylene sulfonate and sodium naphthalene sulfonate), phosphonates, ethoxy sulfates and mixtures thereof.

Exemplary oxygen scavengers are triazines, maleimides, formaldehydes, amines, carboxamides, alkylcarboxyl-azo compounds cumine-peroxide compounds morpholino and amino derivatives morpholine and piperazine derivatives, amine oxides, alkanolamines, aliphatic and aromatic polyamines.

Where the dispersion further contains a water-soluble well treatment agent, the amount of water-soluble well treatment agent in the dispersion is generally about 0.01 to 50, preferably from about 5 to about 25, weight percent based on the weight of the aqueous fluid. The water-soluble well treatment agent is solubilized in the aqueous fluid.

The aqueous dispersion composition may contain one or more additional additive or mixtures of additives, for example, biocides, anti-foaming agents, etc. Such additives are typically added in amounts less than 1 percent by weight based on the total weight of the composition.

The fluid may further be gelled or non-gelled. The fluid may further include gelling agents, cross-linking agents, gel breakers or mixtures thereof.

The aqueous fluid containing the dispersion may be introduced into the well in a squeeze treatment or may be introduced during a hydraulic fracturing, matrix acidizing or fracturing acidizing operation. Typically, the fluid is introduced into the well as a stimulation fluid such as a fracturing fluid or acidizing fluid (as an example, an acid fracturing fluid or a matrix acidizing fluid).

The aqueous treatment fluid described herein may be used in completion as well as production services. For instance, the fluid of the completion fluid may contain zinc bromide, calcium bromide, calcium chloride, and sodium bromide brines as well as a mixture thereof. Such fluids may be introduced down the annulus of the well and, when desired, flushed with produced water.

The aqueous fluids are particularly effective in hydraulic fracturing (including re-fracturing) as well as sand control fluids such as water, salt brine, slickwater such as slick water fracture treatments at relatively low concentrations to achieve partial monolayer fractures, low concentration polymer gel fluids (linear or crosslinked), foams (with gas) fluid, liquid gas such as liquid carbon dioxide fracture treatments for deeper proppant penetration, treatments for water sensitive zones, and treatments for gas storage wells.

When used in hydraulic fracturing, the fracturing fluid may be pumped into the well at pressures sufficiently high enough to create fractures in the formation or enlarge fractures. The treatment fluid may further contain proppant.

Fluids containing the well treatment agent(s(may be used to optimize hydraulic fracture geometries and enhance well productivity. As an example, the fluids may be used to achieve increased propped fracture length in relatively tight gas formations.

The treatment fluid may further be a gas and contain nitrogen or carbon dioxide. For instance, the fluid may be a liquefied gas or a foamed gas, such as liquid $CO_2$, $CO_2/N_2$, and foamed $N_2$ in $CO_2$ based systems. In this regard, liquid $CO_2$ based fracturing job characteristics, such as proppant amounts, proppant sizes, mixing and pumping methodologies, using relatively lightweight porous ceramic materials may be the same as employed for conventional proppants.

Further, a gravel pack operation may be carried out on a wellbore that penetrates a subterranean formation to prevent or substantially reduce the production of formation particles into the wellbore from the formation during production of formation fluids. The subterranean formation may be completed so as to be in communication with the interior of the wellbore by any suitable method known in the art, for example by perforations in a cased wellbore, and/or by an open hole section. A screen assembly such as is known in the art may be placed or otherwise disposed within the wellbore so that at least a portion of the screen assembly is disposed adjacent the subterranean formation. A slurry comprising the treatment fluid may then be introduced into the wellbore and placed adjacent the subterranean formation by circulation or other suitable method so as to form a fluid-permeable pack in an annular area between the exterior of the screen and the interior of the wellbore that is capable of reducing or substantially preventing the passage of formation particles from the subterranean formation into the wellbore during production of fluids from the formation, while at the same time allowing passage of formation fluids from the subterranean formation through the screen into the wellbore.

Additional amount of fluid containing the oil-soluble, water-insoluble well treatment agent, and optional water-soluble well treatment agent, may be injected into the formation any time after the initial charge of well treatment agent has at least partially depleted. Typically, the additional well treatment agent(s) are introduced when the well treatment agent has been substantially depleted and the performance level of the well treatment agent in the well has become unacceptable.

The pumping of fluid containing additional oil-soluble, water-insoluble well treatment agent, and optional water-soluble well treatment agent, may be carried out in the same manner by which the initial fluid was charged into the wellbore, and can be carried out in any conventional method of injecting fluids into a wellbore of an oil or gas well, as mentioned above. The relative amounts of the treatment fluid containing the oil-soluble, water-insoluble treatment agent, and optional water-soluble well treatment agent, may be injected into the wellbore will of course vary depending upon the agent. After the injection step is carried out, the wellbore is pressurized for a time and under conditions sufficient to reactivate the downhole matrix in the formation. Reactivation of the treatment agent downhole may occur through the squeeze process as long as the activity of the treatment agent(s) in the in-place matrix is increased relative to the treatment agent activity of the matrix just prior to injecting the solution. The determination of whether the activity of the treatment agent(s) has increased relative to the activity of that agent just prior to injection of the solution and completion of the squeeze may be made through conventional residual analysis and comparison of the same before and after the squeeze, and conventional analysis of the physical well parameters, e.g., the production rate of the well and well pressure.

When used in gravel packing, the pressure to which the wellbore is pressurized in the squeeze process typically will be a pressure below the fracturing pressure, and when applicable, below the pressure that would cause the gravel pack to break up. In one embodiment of the invention, the pressure is in a range of about 500 to about 15000 psia. The duration for which the pressure condition is applied to the well will vary, depending upon the ease of fracturing, but will typically be in the range of about 2 to about 10 hours.

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

EXAMPLES

All percentages set forth in the Examples are given in terms of weight units except as may otherwise be indicated.

Aqueous dispersible paraffin inhibitor samples (products WD D, WD H and WD K of the Dow Chemical Company) were prepared in accordance with the experimental procedures set forth in U.S. Patent Publication No. 2015/0369822. Aqueous dispersions labeled as WD D through WD K included ACCENT® 1311 (WD D) and various other grades containing ethylene vinyl acetate as paraffin inhibitor. The solids content of the aqueous dispersions is between about 50 and about 52 weight percent; the pH of the dispersions is between about 11.0 and about 11.5; the volume average particle diameter of the dispersed polymer particulates in the dispersion is between about 0.40 to about 0.43 microns (measured by a Coulter LS 13 320 particle analyzer); and the particle size distribution (Dv/Dn) is between about 1.10 and about 1.20. The ethylene vinyl acetate copolymer of the aqueous dispersions generally contained about 25 to about 52 weight percent vinyl acetate and are commercially available as ELVAX® 150 and ELVAX® 240 W from E. I. Du Pont de Nemours and Company. The polymers exhibit a density of about 0.94 to about 0.96 g/cc (ASTM D-792), a melt index of about 43 g/10 minutes (ASTM D1238 at 190° C. and 2.16 kg), and a DSC melting point from about 60° C. to about 75° C. (ASTM 3418).

The hydrocarbon based, oil-soluble paraffin inhibitors (HC A, HC B and HC C) contained about 11-13% weight percent of ELVAX® 150 ethylene vinyl acetate copolymer in a ~87-89% hydrocarbon solvent (xylene, mineral oil etc.) The aqueous dispersions had micron sized oil-soluble inhibitor particles suspended in an aqueous solvent with no hydrocarbon and had up to 50% by weight of the paraffin inhibitor. The volume average diameter of the dispersed polymer particulates in the dispersion is between about 0.40 to about 0.43 microns.

Example 1. The viscosity of HC A and WD D were measured on an OFITE M900 viscometer, available from the OFI Testing Equipment, Inc., using a R1B1 rotor-bob configuration @ 511 sec$^{-1}$. Both products had an active polymer concentration of ~40%. The viscosity of the HC A was greater than 122,000 cP (at 80° F.) and the viscosity of the WD D aqueous dispersion was 21 cP (at 80° F.). The loading of oil-soluble paraffin inhibitors in treatment fluids is much higher when the treatment fluids contain the paraffin inhibitors dispersed in the aqueous composition versus hydrocarbon based solvent systems.

Examples 2-6. The pour point of the extracted oil containing the dispersions was determined in accordance with ASTM D-97. The samples were heated to a temperature above the cloud point of the crude oil and then allowed to cool in sequentially decreasing temperatures from 80° F. to −30° F. The pour point, defined as the temperature, at which the crude stops moving when held 90 degrees from the upright for 5 seconds, is set forth in Table I:

TABLE I

| Ex. No. | | Loading ppm | Pour Point | Delta T |
|---|---|---|---|---|
| | Blank | 0 | 30 F. | 0 |
| 2 | WD D | 1000 | 30 F. | 0 |
| 3 | HC B | 1000 | 15 F. | 15 |
| 4 | HC C | 1000 | 0 F. | 30 |
| 5 | WD H | 1000 | <−26 F., viscous pour | 50+ |
| 6 | WD K | 1000 | <−26 F., viscous pour | 50+ |

The results in Table I show that the aqueous dispersions reduced pour point similarly to the oil dispersions.

Examples 7-10. Cold finger testing was conducted on the crude oil treated with various dosages of the aqueous dispersion based inhibitors and hydrocarbon solvent based ones. A Lawler pour point equipment was used when first the oil was initially heated to 180F, and then transferred onto a cold finger chamber. The oil was heated to 5° F. above the cloud point of the oil, while the cold finger probe was cooled to 20°-40° F. below the cloud point of the oil. The amount of paraffin deposited on the probe after 16 h is weighed and reported as deposit weight.

The column was then placed into a water bath at the desired temperature and flowed at a rate of 2.0 mL per minute with crude oil/Isopar until the paraffin deposit was equal to or greater than the untreated crude oil. 100 mL samples are taken continuously. A timer was used to verify exact time intervals. The amount of paraffin deposition on the cold finger probes was then determined. The results are shown in Table II:

TABLE II

| Ex. No. | | Loading | Before | After | Deposit Wt | Percent Inhibition |
|---|---|---|---|---|---|---|
| | Blank | 0 | 32.505 | 32.752 | 0.247 | n/a |
| 7 | HC B | 1000 | 32.537 | 32.543 | 0.006 | 98% |
| 8 | WD H | 1000 | 32.503 | 32.526 | 0.023 | 91% |
| 9 | HC A | 1000 | 32.551 | 32.575 | 0.024 | 90% |
| 10 | WD K | 1000 | 32.505 | 32.532 | 0.027 | 89% |

Example 11. Fracturing fluids were prepared by hydrating 30 parts per thousand (ppt) guar gel (GW-3) for 30 min in Tomball tap water. This was followed by addition of 3 gallons per thousand (gpt) of buffer (BF-7L), 2 gpt of gel stabilizer (GS-1L), clay control additive (Clay Care 2C). After this was added the aqueous dispersion based 1 gpt paraffin inhibitor (WD D/WD K) followed by 3 gpt of borate cross-linker (XLW-30G) and subsequently the fluid was loaded into a Chandler 5550 cup. (GW-3, BF-7L, GS-1L, Clay Care 2C and XLW-30G) are products of Baker Hughes, a GE company.) The fluid was initially run through a shear rate sweep of 100, 75, 50, and 25 sec$^{-1}$ to calculate the power law indices n' and K' at ambient temperature. The fluid was sheared at 100 sec$^{-1}$ in between shear rate sweeps and the shear rate sweep repeated every 15 minutes for 2 hours 5 minutes then every 30 minutes for the next hour. A R1B5 rotor-bob configuration was used.

Compatibility testing on the fracturing fluids were conducted with WD D and WD K at 250° F. The paraffin inhibitors are considered to incompatible if there is no visible separation of the fluid system is noticed, and the additive does not affect the fluid viscosity by greater than 20%. FIG. 1 shows that WD D is compatible with the fracturing fluid at 250° F. This is attributable to the aqueous nature of the added paraffin dispersions along with small sub-micron sized particles of the paraffin inhibitor in the aqueous treatment fluid reduces issues related to solids settling. In contrast, paraffin inhibitors from a hydrocarbon based dispersion are incompatible in fracturing fluids at in light of the separation of the oil phase from the aqueous phase.

The methods that may be described above or claimed herein and any other methods which may fall within the scope of the appended claims can be performed in any desired suitable order and are not necessarily limited to any sequence described herein or as may be listed in the appended claims. Further, the methods of the present disclosure do not necessarily require use of the particular embodiments shown and described herein, but are equally applicable with any other suitable structure, form, and configuration of components.

While exemplary embodiments of the disclosure have been shown and described, many variations, modifications and/or changes of the system, apparatus and methods of the present disclosure, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the disclosure and scope of appended claims. Thus, all matter herein set forth or shown in the accompanying drawings should be interpreted as illustrative, and the scope of the disclosure and the appended claims should not be limited to the embodiments described and shown herein.

What is claimed is:

1. A method of treating a well or a subterranean formation penetrated by a well which comprises pumping into the well an aqueous treatment fluid comprising one or more oil-soluble, water-insoluble well treatment agents selected from the group consisting of paraffin inhibitors, corrosion inhibitors, asphaltene inhibitors and mixtures thereof wherein the oil-soluble, water-insoluble well treatment agents, when pumped into the well, are a component of an aqueous dispersion composition, the aqueous dispersion composition comprising (i) the one or more oil-soluble, water-insoluble well treatment agents dispersed in water, (ii) a dispersing agent and (iii) one or more water-soluble well treatment agents, the amount of the one or more oil-soluble, water-insoluble well treatment agents in the aqueous dispersion composition being between from about 25 to about 60 weight percent and wherein at least one of the following prevail:

(a) the one or more oil-soluble, water-insoluble well treatment agents include a paraffin inhibitor selected from the group consisting of copolymers of ethylene and a $C_3$-$C_5$ alkene, copolymers of ethylene and acrylonitrile, acrylate or methacrylate containing polymers, copolymers of maleic anhydride and an alpha olefin or copolymers of an alkyl maleimide and an alpha olefin and mixtures thereof;

(b) the one or more oil-soluble, water-insoluble well treatment agents include an asphaltene inhibitor selected from the group consisting of polyalkyl phenols, phenol/aldehyde oligomers, phenol/formaldehyde/amine resins, polyalkyl succinimide copolymers, a phosphate ester of an alkyl phenol ethoxylate, a polyester or a polyvinyl pyrrolidone, a poly(vinylalkyl carbamate) and mixtures thereof; or (c) the one or more oil-soluble, water-insoluble well treatment agents include a corrosion inhibitor selected from the group consisting of oxidized petroleum oils, phosphate esters, fatty acid salts and esters thereof, an organic polyamine, a tall oil fatty acid imidazoline, a polyamidoamine, a polyamide, a polyhydroxy or ethoxylated amine or amide, a phosphate ester of a polyol and mixtures thereof.

2. The method of claim 1, wherein the oil-soluble, water-insoluble well treatment agents have a volume average particle diameter less than or equal to 2.0 microns.

3. The method of claim 1, wherein the volume average particle diameter of the one or more oil-soluble, water-insoluble well treatment agents is less than or equal to 1.5 microns.

4. The method of claim 3, wherein the volume average particle diameter of the one or more oil-soluble, water-insoluble well treatment agents is less than or equal to 1.0 microns.

5. The method of claim 4, wherein the volume average particle diameter of the one or more oil-soluble, water-insoluble well treatment agents is less than or equal to 0.5 microns.

6. The method of claim 5, wherein the volume average particle diameter of the one or more oil-soluble, water-insoluble well treatment agents is less than or equal to 0.2 microns.

7. The method of claim 1, wherein the one or more water-soluble well treatment agents are selected from the group consisting of scale inhibitors, corrosion inhibitors, salt inhibitors, biocides and mixtures thereof.

8. The method of claim 1, wherein the amount of the one or more water-soluble well treatment agents in the aqueous dispersion composition is between from about 5 to about 25 weight percent.

9. The method of claim 1, wherein the aqueous treatment fluid pumped into the well is free of oil.

10. The method of claim 1, wherein the aqueous treatment fluid is a fracturing fluid or a completion fluid or the aqueous treatment fluid is pumped into the well in a sand control operation.

11. The method of 1, wherein the one or more oil-soluble, water-insoluble well treatment agents include ethylene vinyl acetate.

12. The method of claim 11, wherein the aqueous treatment fluid is a fracturing fluid or completion fluid or is pumped into the well in a sand control operation.

13. The method of claim 11, wherein the one or more water-soluble well treatment agents are selected from the group consisting of scale inhibitors, corrosion inhibitors, salt inhibitors, biocides and mixtures thereof.

14. The method of claim 11, wherein the amount of the one or more water-soluble well treatment agents in the aqueous dispersion is between from about 5 to about 25 weight percent.

15. The method of claim 1, wherein the amount of the dispersing agent in the aqueous dispersion is from about 1 to about 10 weight percent.

16. The method of claim 1, wherein the dispersing agent is an anionic or cationic surfactant.

17. The method of claim 1, wherein the dispersing agent is a zwitterionic or non-ionic surfactant.

18. The method of claim 1, wherein the aqueous dispersion is stable between $-40°$ C. to $40°$ C.

19. The method of claim 1, wherein the aqueous dispersion further contains a freezing point depressant.

20. The method of claim 1, wherein the one or more water-soluble well treatment agents are selected from the group consisting of paraffin inhibitors, gas hydrate inhibitors, oxygen scavengers, demulsifying agents and mixtures thereof.

* * * * *